United States Patent
Yedluri et al.

(10) Patent No.: US 11,928,223 B2
(45) Date of Patent: *Mar. 12, 2024

(54) SYSTEM FOR IMPLEMENTING ENHANCED FILE ENCRYPTION TECHNIQUE

(71) Applicant: BANK OF AMERICA CORPORATION, Charlotte, NC (US)

(72) Inventors: Praveen Chakravarthy Yedluri, Hyderabad (IN); Shyam Acharya, Monroe, NJ (US)

(73) Assignee: BANK OF AMERICA CORPORATION, Charlotte, NC (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/102,048

(22) Filed: Jan. 26, 2023

(65) Prior Publication Data
US 2023/0177178 A1    Jun. 8, 2023

Related U.S. Application Data

(63) Continuation of application No. 17/229,946, filed on Apr. 14, 2021, now Pat. No. 11,610,004.

(51) Int. Cl.
| | | |
|---|---|---|
| *G06F 21/60* | (2013.01) | |
| *G06F 21/31* | (2013.01) | |
| *G06F 21/62* | (2013.01) | |
| *G06F 21/10* | (2013.01) | |

(52) U.S. Cl.
CPC .......... *G06F 21/602* (2013.01); *G06F 21/31* (2013.01); *G06F 21/604* (2013.01); *G06F 21/6227* (2013.01); *G06F 21/107* (2023.08)

(58) Field of Classification Search
CPC .... G06F 21/6227; G06F 21/31; G06F 21/602; G06F 2221/0751
See application file for complete search history.

(56) References Cited

U.S. PATENT DOCUMENTS

| | | |
|---|---|---|
| 5,222,140 A | 6/1993 | Beller |
| 5,448,623 A | 9/1995 | Wiedeman |
| 5,613,086 A | 3/1997 | Frey |
| 5,940,507 A * | 8/1999 | Cane .................. G06F 21/6218 713/193 |
| 6,157,925 A | 12/2000 | Jenkins |
| 6,327,652 B1 | 12/2001 | England |

(Continued)

*Primary Examiner* — James R Turchen
(74) *Attorney, Agent, or Firm* — Moore & Van Allen PLLC; Anup Shrinivasan Iyer

(57) ABSTRACT

Systems, computer program products, and methods are described herein for implementing enhanced file encryption technique. The present invention is configured to receive a request from a computing device of a user to encrypt a file; encrypt the file using a local file encryption key to generate an encrypted file; transmit, via an encryption engine, a first encryption request to an encryption server to encrypt a first portion of the encrypted file; receive, from the encryption server, an encrypted first portion of the encrypted file based on at least the first encryption request, wherein the first portion of the encrypted file is encrypted by the encryption server using a first file encryption key; append the encrypted first portion of the encryption file with a remaining portion of the encrypted file to generate a final encrypted file; and store the final encrypted file in a data repository.

18 Claims, 4 Drawing Sheets

(56) References Cited

U.S. PATENT DOCUMENTS

| | | | |
|---|---|---|---|
| 6,389,471 B1 | 5/2002 | Agraharam | |
| 6,731,995 B2 | 5/2004 | Takeuchi | |
| 6,754,838 B2 | 6/2004 | Burns | |
| 6,957,370 B2 | 10/2005 | Ando | |
| 6,963,976 B1 * | 11/2005 | Jutla | H04L 9/0637 713/168 |
| 7,043,016 B2 * | 5/2006 | Roelse | H04L 9/0625 380/46 |
| 7,069,585 B1 | 6/2006 | Chess | |
| 7,110,545 B2 * | 9/2006 | Furuya | H04L 9/0625 380/259 |
| 7,225,361 B2 | 5/2007 | Cobb | |
| 7,346,162 B2 * | 3/2008 | Slavin | H04L 9/302 380/255 |
| 7,450,720 B2 * | 11/2008 | Roelse | H04L 9/0618 380/259 |
| 7,869,367 B2 | 1/2011 | Albrecht | |
| 8,051,360 B2 | 11/2011 | Bolourchi | |
| 8,266,270 B1 | 9/2012 | Gerlach | |
| 8,504,868 B2 | 8/2013 | Bohno | |
| 8,681,986 B2 * | 3/2014 | Jutla | H04L 9/3218 713/2 |
| 8,706,995 B2 | 4/2014 | Gaiser | |
| 8,745,798 B2 | 6/2014 | Wang | |
| 8,984,611 B2 * | 3/2015 | Jeannot | H04L 63/20 726/9 |
| 9,312,427 B2 | 4/2016 | Li | |
| 9,639,876 B1 | 5/2017 | Ross, Jr. | |
| 10,356,276 B2 | 7/2019 | Watanabe | |
| 10,523,423 B2 * | 12/2019 | Lim | H04L 9/0822 |
| 2006/0005250 A1 * | 1/2006 | Chu | G06F 21/14 726/26 |
| 2008/0263363 A1 * | 10/2008 | Jueneman | H04L 9/0877 713/184 |
| 2011/0072264 A1 * | 3/2011 | McNulty | G06F 21/6272 380/278 |
| 2012/0269348 A1 * | 10/2012 | Rong | G06F 21/6218 380/278 |
| 2013/0034229 A1 * | 2/2013 | Sauerwald | G06F 11/1458 380/46 |
| 2014/0369498 A1 * | 12/2014 | Hammersmith | H04L 9/0656 380/46 |
| 2015/0326547 A1 * | 11/2015 | Carlson | H04L 63/061 713/171 |
| 2016/0112413 A1 * | 4/2016 | Wang | G06F 16/137 713/171 |
| 2016/0321133 A1 * | 11/2016 | Oliver | G06F 3/0619 |
| 2017/0302653 A1 * | 10/2017 | Ortner | H04L 63/0435 |
| 2017/0302696 A1 * | 10/2017 | Schutz | G06F 21/554 |
| 2018/0139188 A1 * | 5/2018 | Iyer | G06F 21/6209 |
| 2019/0386967 A1 * | 12/2019 | Iyer | H04L 63/0478 |

* cited by examiner

SYSTEM FOR IMPLEMENTING ENHANCED FILE ENCRYPTION TECHNIQUE

CROSS-REFERENCE TO RELATED APPLICATION

The present application is a continuation application of and claims priority to U.S. patent application Ser. No. 17/229,946 filed Apr. 14, 2021 of the same title; the contents of which are also incorporated by reference herein.

FIELD OF THE INVENTION

The present invention embraces a system for implementing enhanced file encryption technique.

BACKGROUND

Entities often deal with data files that are large in size and/or have sensitive information stored therein. There is an inherent exposure in making a server side call and transmitting data files that are large and/or have sensitive information to an encryption server for encryption. In attempt to mitigate exposure, entities may resort to local encryption as the sole means of securing data, that leaves them vulnerable to malicious actors. There is a need for a system for implementing enhanced file encryption technique.

SUMMARY

The following presents a simplified summary of one or more embodiments of the present invention, in order to provide a basic understanding of such embodiments. This summary is not an extensive overview of all contemplated embodiments and is intended to neither identify key or critical elements of all embodiments nor delineate the scope of any or all embodiments. Its sole purpose is to present some concepts of one or more embodiments of the present invention in a simplified form as a prelude to the more detailed description that is presented later.

In one aspect, a system for implementing enhanced file encryption technique is presented. The system comprising: at least one non-transitory storage device; and at least one processing device coupled to the at least one non-transitory storage device, wherein the at least one processing device is configured to: receive a request from a computing device of a user to encrypt a file; encrypt the file using a local file encryption key to generate an encrypted file; transmit, via an encryption engine, a first encryption request to an encryption server to encrypt a first portion of the encrypted file; receive, from the encryption server, an encrypted first portion of the encrypted file based on at least the first encryption request, wherein the first portion of the encrypted file is encrypted by the encryption server using a first file encryption key; append the encrypted first portion of the encryption file with a remaining portion of the encrypted file to generate a final encrypted file; and store the final encrypted file in a data repository.

In some embodiments, the at least one processing device is further configured to: transmit, via the encryption engine, a second encryption request to the encryption server to encrypt the local file encryption key; receive, from the encryption server, an encrypted local file encryption key based on at least the second encryption request, wherein the local encryption key is encrypted by the encryption server using a second file encryption key; and update the final encrypted file with the encrypted local file encryption key, wherein updating further comprises appending the encrypted local file encryption key with the first portion of the encrypted file and the remaining portion of the encrypted file.

In some embodiments, the at least one processing device is further configured to: calculate a checksum for the encrypted file; transmit, via the encryption engine, a third encryption request to the encryption server to encrypt the checksum; receive, from the encryption server, an encrypted checksum based on at least the third encryption request, wherein the checksum is encrypted by the encryption server using a third file encryption key; and update the final encrypted file with the encrypted checksum, wherein updating further comprises appending the encrypted checksum with the encrypted local file encryption key, the first portion of the encrypted file, and the remaining portion of the encrypted file.

In some embodiments, the at least one processing device is further configured to: receive an access request from the computing device of the user to access the file; initiate an authentication protocol to determine whether the user is authorized to access the file; and decrypt the final encrypted file based on at least determining that the user is authorized to access the file.

In some embodiments, the at least one processing device is further configured to: initiate the authentication protocol, wherein initiating further comprises: transmitting, via the computing device of the user, an authentication request; receiving, via the computing device of the user, one or more authentication credentials from the user; validating the one or more authentication credentials; and determining that the user is authorized to access the file based on at least validating the one or more authentication credentials.

In some embodiments, the at least one processing device is further configured to: validate the one or more authentication credentials, wherein validating further comprises: determining an authorization level of the user based on at least the one or more authentication credentials; determining an authorization requirement associated with accessing the file; determining that the authorization level of the user meets the authorization requirement associated with accessing the file; and determining that the user is authorized to access the file based on at least determining that the authorization level of the user meets the authorization requirement associated with accessing the file.

In some embodiments, the at least one processing device is further configured to: retrieve the final encryption file from the data repository; and extract, from the final encryption file, the encrypted first portion of the encrypted file, the encrypted local file encryption key, the encrypted checksum, and the remaining portion of the encrypted file.

In some embodiments, the at least one processing device is further configured to: transmit, via the encryption engine, a first decryption request to the encryption server to decrypt the encrypted first portion of the encrypted file, wherein the first decryption request comprises the encrypted first portion of the encrypted file; and receive, from the encryption server, the first portion of the encrypted file based on at least the first decryption request, wherein the first portion of the encrypted file is decrypted by the encryption server using the first file encryption key.

In some embodiments, the at least one processing device is further configured to: transmit, via the encryption engine, a second decryption request to the encryption server to decrypt the encrypted local file encryption key, wherein the second decryption request comprises the encrypted first file encryption key; and receive, from the encryption server, the local file encryption key based on at least the second decryption request, wherein the encrypted local file encryption key is decrypted by the encryption server using the second file encryption key.

In some embodiments, the at least one processing device is further configured to: transmit, via the encryption engine, a third decryption request to the encryption server to decrypt the encrypted checksum, wherein the third decryption request comprises the encrypted checksum; and receive, from the encryption server, the checksum based on at least the third decryption request, wherein the encrypted checksum is decrypted by the encryption server using the third file encryption key.

In some embodiments, the at least one processing device is further configured to: receive, from the encryption server, the first portion of the encrypted file based on at least the first decryption request; append the first portion of the encrypted file to the remaining portion of the encrypted file to generate an appended encrypted file; and calculate the checksum of the appended encrypted file.

In some embodiments, the at least one processing device is further configured to: compare the checksum of the appended encrypted file with the checksum of the encrypted file to determine a match; and determine that the appended encrypted file is identical the encrypted file based on at least the match.

In some embodiments, the at least one processing device is further configured to: decrypt the appended encrypted file using the local file encryption key to generate the file; and transmit control signals configured to cause the computing device of the user to display the file.

In another aspect, a computer program product for implementing enhanced file encryption technique is presented. The computer program product comprising a non-transitory computer-readable medium comprising code causing a first apparatus to: receive a request from a computing device of a user to encrypt a file; encrypt the file using a local file encryption key to generate an encrypted file; transmit, via an encryption engine, a first encryption request to an encryption server to encrypt a first portion of the encrypted file; receive, from the encryption server, an encrypted first portion of the encrypted file based on at least the first encryption request, wherein the first portion of the encrypted file is encrypted by the encryption server using a first file encryption key; append the encrypted first portion of the encryption file with a remaining portion of the encrypted file to generate a final encrypted file; and store the final encrypted file in a data repository.

In yet another aspect, a method for implementing enhanced file encryption technique is presented. The method comprising: receiving a request from a computing device of a user to encrypt a file; encrypting the file using a local file encryption key to generate an encrypted file; transmitting, via an encryption engine, a first encryption request to an encryption server to encrypt a first portion of the encrypted file; receiving, from the encryption server, an encrypted first portion of the encrypted file based on at least the first encryption request, wherein the first portion of the encrypted file is encrypted by the encryption server using a first file encryption key; appending the encrypted first portion of the encryption file with a remaining portion of the encrypted file to generate a final encrypted file; and storing the final encrypted file in a data repository.

The features, functions, and advantages that have been discussed may be achieved independently in various embodiments of the present invention or may be combined with yet other embodiments, further details of which can be seen with reference to the following description and drawings.

BRIEF DESCRIPTION OF THE DRAWINGS

Figure 1:
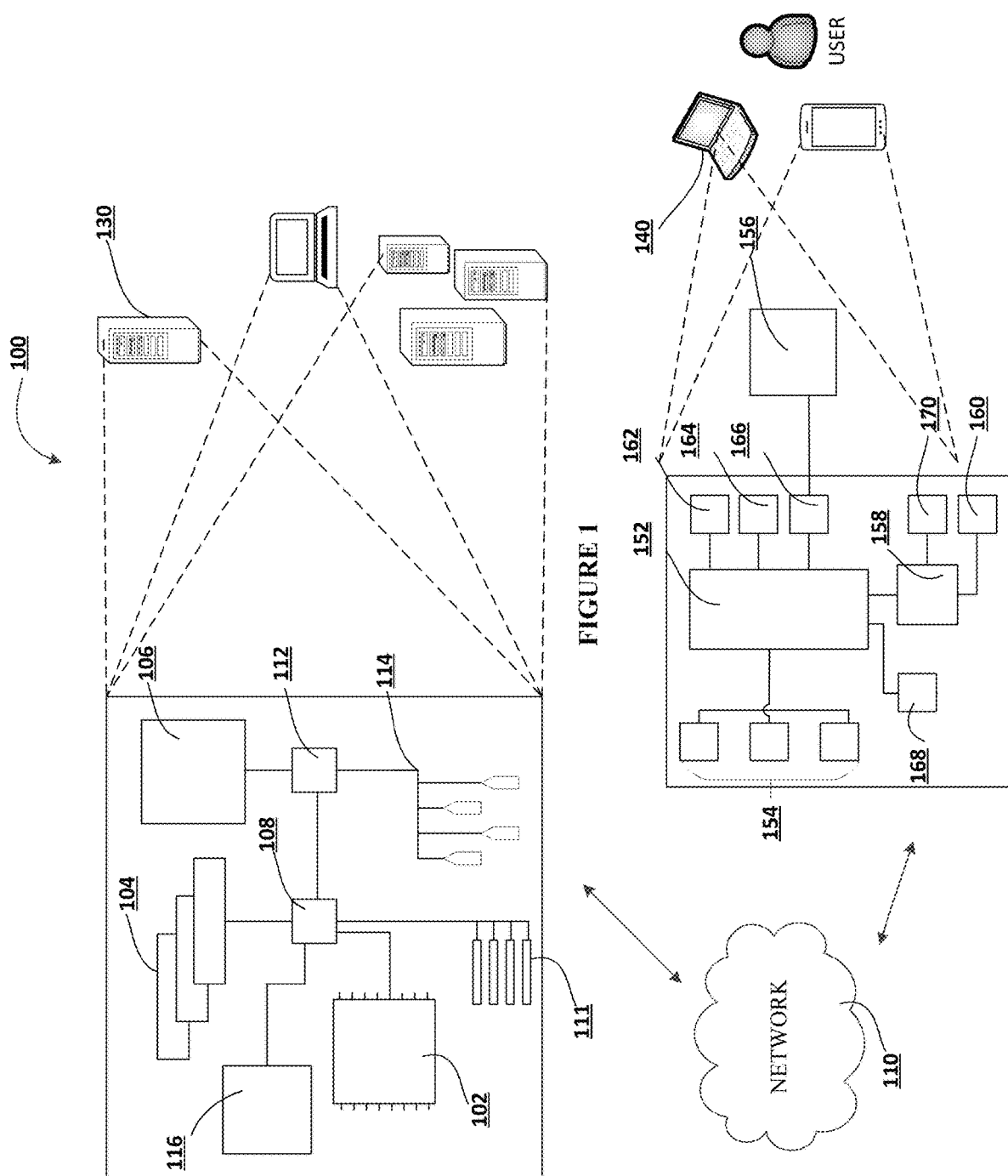
Figure 2:
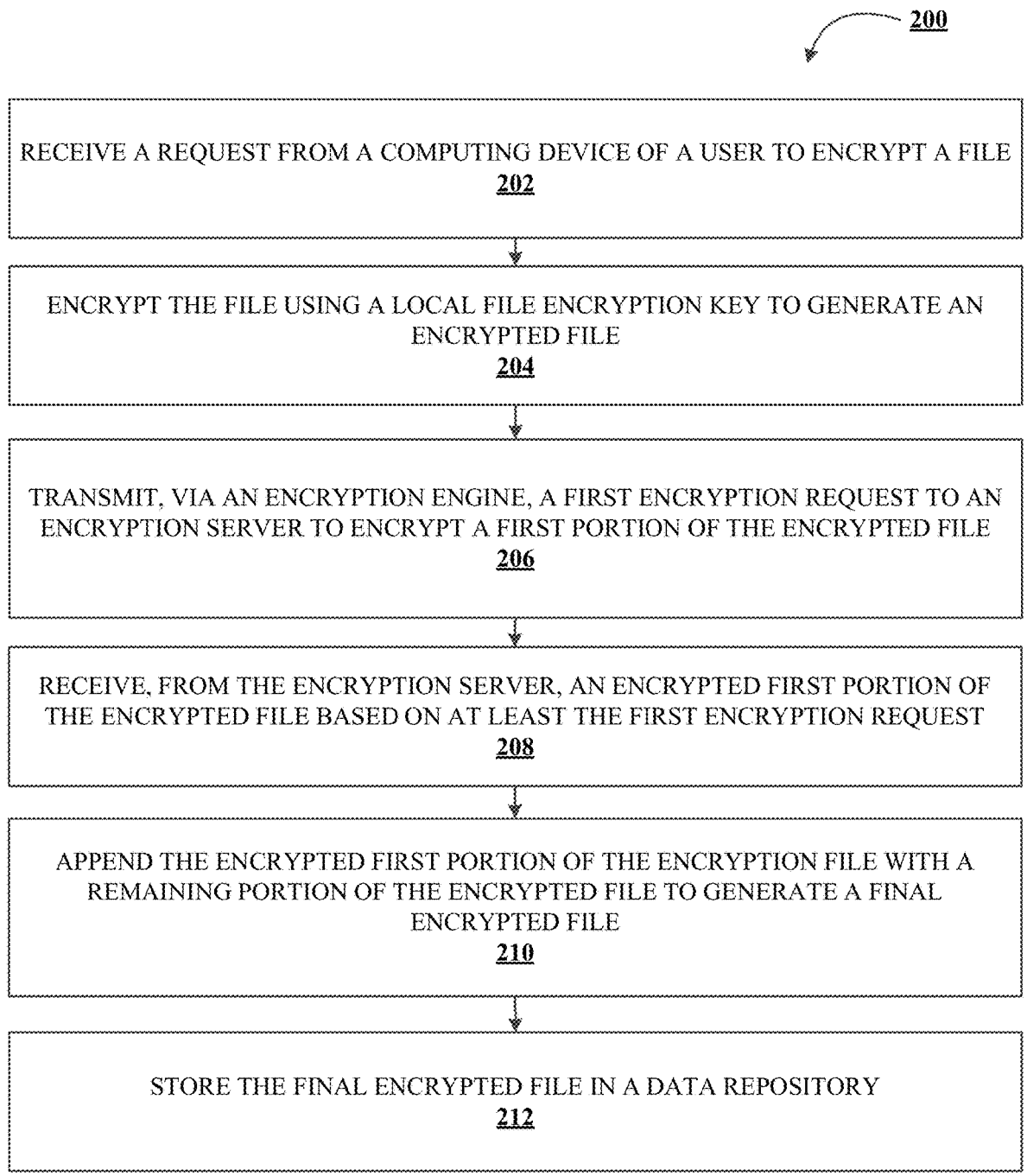
Figure 3:
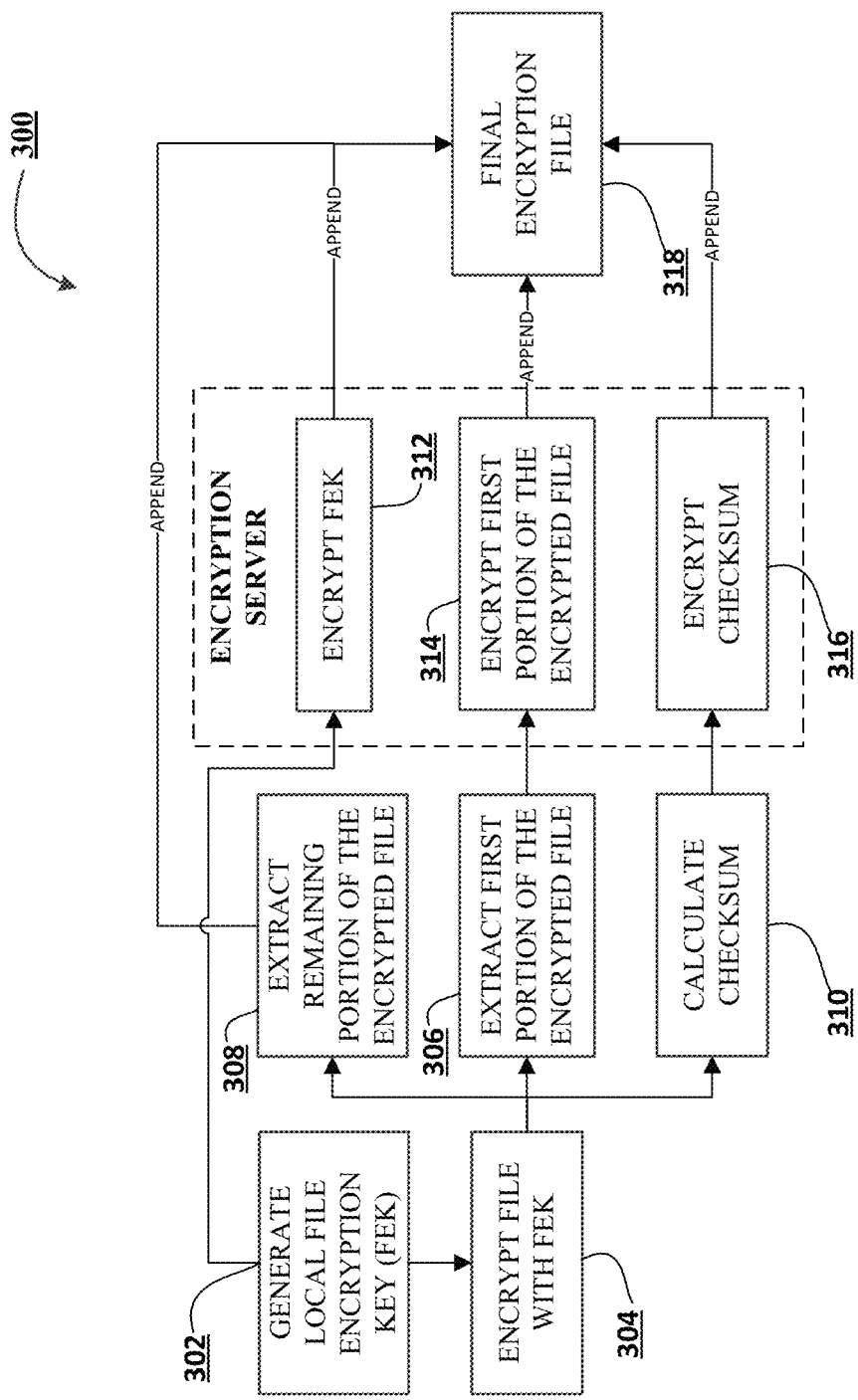
Figure 4:
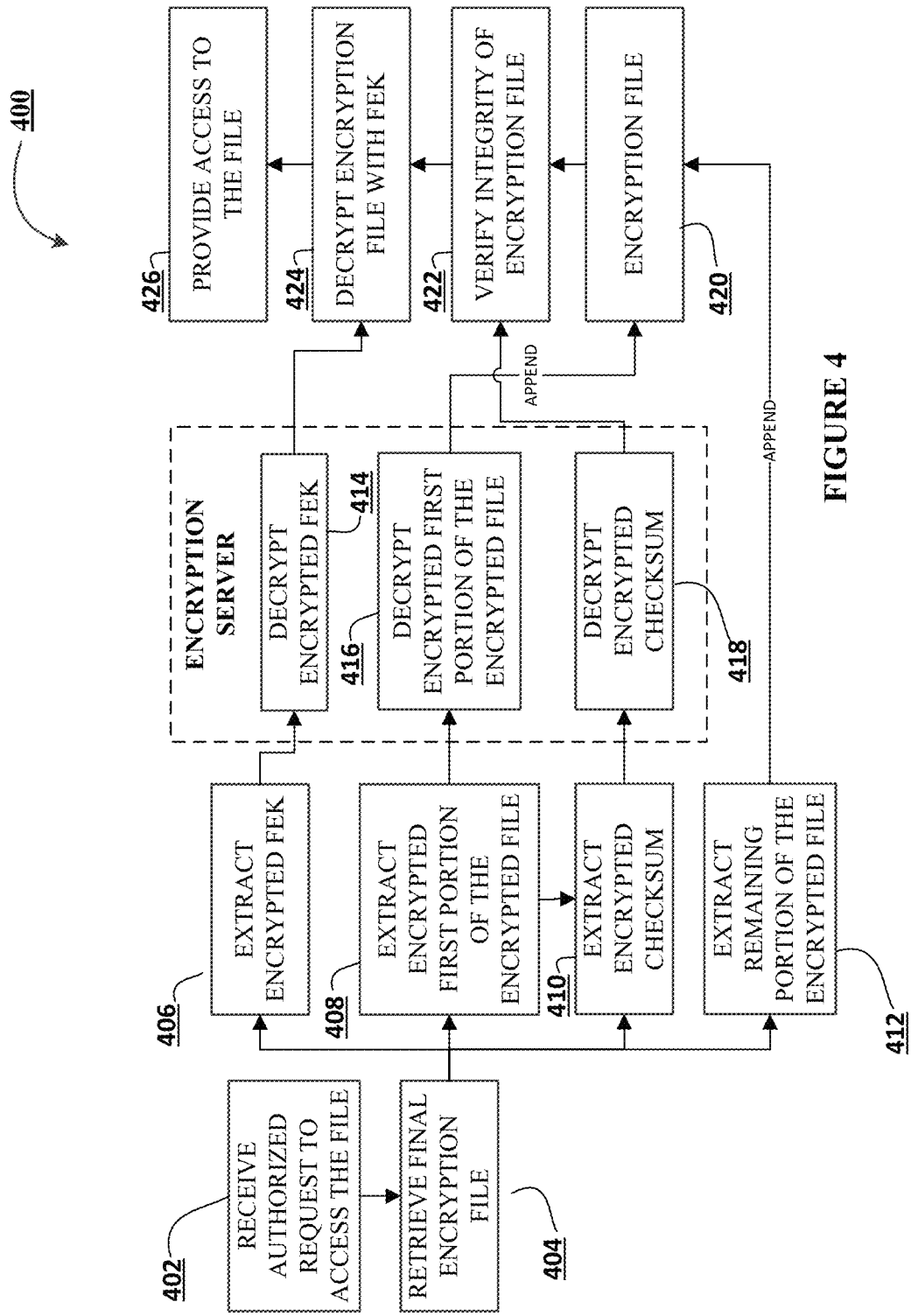

Having thus described embodiments of the invention in general terms, reference will now be made the accompanying drawings, wherein:

FIG. 1 illustrates technical components of a system for implementing enhanced file encryption technique, in accordance with an embodiment of the invention;

FIG. 2 illustrates a process flow for implementing enhanced file encryption technique, in accordance with an embodiment of the invention;

FIG. 3 illustrates a data flow diagram of the encryption process, in accordance with an embodiment of the invention; and FIG. 4 illustrates a data flow diagram of the decryption process, in accordance with an embodiment of the invention.

DETAILED DESCRIPTION OF EMBODIMENTS OF THE INVENTION

Embodiments of the present invention will now be described more fully hereinafter with reference to the accompanying drawings, in which some, but not all, embodiments of the invention are shown. Indeed, the invention may be embodied in many different forms and should not be construed as limited to the embodiments set forth herein; rather, these embodiments are provided so that this disclosure will satisfy applicable legal requirements. Where possible, any terms expressed in the singular form herein are meant to also include the plural form and vice versa, unless explicitly stated otherwise. Also, as used herein, the term "a" and/or "an" shall mean "one or more," even though the phrase "one or more" is also used herein. Furthermore, when it is said herein that something is "based on" something else, it may be based on one or more other things as well. In other words, unless expressly indicated otherwise, as used herein "based on" means "based at least in part on" or "based at least partially on." Like numbers refer to like elements throughout.

As used herein, an "entity" may be any institution employing information technology resources and particularly technology infrastructure configured for processing large amounts of data. Typically, these data can be related to the people who work for the organization, its products or services, the customers or any other aspect of the operations of the organization. As such, the entity may be any institution, group, association, financial institution, establishment, company, union, authority or the like, employing information technology resources for processing large amounts of data.

As described herein, a "user" may be an individual associated with an entity. As such, in some embodiments, the user may be an individual having past relationships, current relationships or potential future relationships with an entity. In some embodiments, a "user" may be an employee (e.g., an associate, a project manager, an IT specialist, a manager, an administrator, an internal operations analyst, or the like) of the entity or enterprises affiliated with the entity, capable of operating the systems described herein. In some embodiments, a "user" may be any individual, entity or system who has a relationship with the entity, such as a customer or a prospective customer. In other embodiments, a user may be a system performing one or more tasks described herein.

As used herein, a "user interface" may be any device or software that allows a user to input information, such as commands or data, into a device, or that allows the device to output information to the user. For example, the user interface includes a graphical user interface (GUI) or an interface to input computer-executable instructions that direct a processing device to carry out specific functions. The user interface typically employs certain input and output devices to input data received from a user second user or output data to a user. These input and output devices may include a display, mouse, keyboard, button, touchpad, touch screen, microphone, speaker, LED, light, joystick, switch, buzzer, bell, and/or other user input/output device for communicating with one or more users.

As used herein, "authentication credentials" may be any information that can be used to identify of a user. For example, a system may prompt a user to enter authentication information such as a username, a password, a personal identification number (PIN), a passcode, biometric information (e.g., iris recognition, retina scans, fingerprints, finger veins, palm veins, palm prints, digital bone anatomy/structure and positioning (distal phalanges, intermediate phalanges, proximal phalanges, and the like), an answer to a security question, a unique intrinsic user activity, such as making a predefined motion with a user device. This authentication information may be used to authenticate the identity of the user (e.g., determine that the authentication information is associated with the account) and determine that the user has authority to access an account or system. In some embodiments, the system may be owned or operated by an entity. In such embodiments, the entity may employ additional computer systems, such as authentication servers, to validate and certify resources inputted by the plurality of users within the system. The system may further use its authentication servers to certify the identity of users of the system, such that other users may verify the identity of the certified users. In some embodiments, the entity may certify the identity of the users. Furthermore, authentication information or permission may be assigned to or required from a user, application, computing node, computing cluster, or the like to access stored data within at least a portion of the system.

It should also be understood that "operatively coupled," as used herein, means that the components may be formed integrally with each other, or may be formed separately and coupled together. Furthermore, "operatively coupled" means that the components may be formed directly to each other, or to each other with one or more components located between the components that are operatively coupled together. Furthermore, "operatively coupled" may mean that the components are detachable from each other, or that they are permanently coupled together. Furthermore, operatively coupled components may mean that the components retain at least some freedom of movement in one or more directions or may be rotated about an axis (i.e., rotationally coupled, pivotally coupled). Furthermore, "operatively coupled" may mean that components may be electronically connected and/or in fluid communication with one another.

As used herein, an "interaction" may refer to any communication between one or more users, one or more entities or institutions, and/or one or more devices, nodes, clusters, or systems within the system environment described herein. For example, an interaction may refer to a transfer of data between devices, an accessing of stored data by one or more nodes of a computing cluster, a transmission of a requested task, or the like.

As used herein, an "engine" may refer to elements of a computer program that are deployable, manageable, and/or natively reusable. An engine may be self-contained, but externally-controllable code that encapsulates powerful logic designed to perform or execute a specific type of function (e.g., encrypt a file). The specific components of an engine may vary based on the needs of the specific computer program as part of the larger piece of software. An engine may be configured to be deployed on any system as a service, made available by an encryption server under a client-server model. The system (client) may rely on sending a request via the engine to the encryption server (server) to execute specific functions. In one aspect, the client and the server may reside in the same system. In another aspect, the client and the server may reside in different systems and communicate through a connected network. The client-server relationship may communicate in a request-response messaging pattern based on a communications protocol that defines the rules, language, and dialog patterns to be used.

As used herein, "appending" may refer to the operation of concatenating a collection of data file elements. Data file elements may be appended sequentially, one after another. Alternatively, data file elements may be appended in parallel. When appended, the positional values of each data file element are recorded so that individual data file elements may be identified efficiently during the retrieval process.

Entities of all sizes across industries are implementing data encryption technology to protect their data. In general, encryption is the process of changing the underlying electronic information ("encrypt") that constitutes the data in such a way that it is unreadable by anyone that does not "hold the key." The key allows the user to change information back to its original form ("decrypt") so it is usable and readable. A number of entities implement a local encryption paradigm to encrypt and store their data. This results in both the encryption key and the data itself to be stored in the same system, increasing the possibility of misappropriation by malicious actors. To resolve this issue, entities are increasingly employing a client-service model, such that when the system (client) wishes to encrypt a data file, the data file is transmitted to a encryption server (server) which encrypts the data file and transmits the encrypted file back to the system. Any file encryption key used by the encryption server to encrypt the data is stored in a hardware security module that is associated with the encryption server. In this process, the encrypted data and the key used to encrypt the data reside in two different systems, decreasing the possibility of misappropriation by malicious actors.

However, entities often deal with data files that are large in size and/or have sensitive information stored therein. There is an inherent exposure in making a server side call and transmitting data files that are large and/or have sensitive information to an encryption server for encryption. In attempt to mitigate exposure, entities may resort to local encryption as the sole means of securing data, that leaves them vulnerable to malicious actors. The present invention provides the functional benefit of allowing entities to encrypt large files and/or files with sensitive information locally without having to transmit the files to the encryption server, while still using the advantages provided by the client-server model when it comes to encryption key storage.

FIG. 1 presents an exemplary block diagram of the system environment for implementing enhanced file encryption technique 100, in accordance with an embodiment of the invention. FIG. 1 provides a unique system that includes specialized servers and system communicably linked across a distributive network of nodes required to perform the functions of the process flows described herein in accordance with embodiments of the present invention.

As illustrated, the system environment 100 includes a network 110, a system 130, and a user input system 140. In some embodiments, the system 130, and the user input system 140 may be used to implement the processes described herein, in accordance with an embodiment of the present invention. In this regard, the system 130 and/or the user input system 140 may include one or more applications stored thereon that are configured to interact with one another to implement any one or more portions of the various user interfaces and/or process flow described herein.

In accordance with embodiments of the invention, the system 130 is intended to represent various forms of digital computers, such as laptops, desktops, video recorders, audio/video player, radio, workstations, personal digital assistants, servers, wearable devices, Internet-of-things devices, augmented reality (AR) devices, virtual reality (VR) devices, extended reality (XR) devices automated teller machine devices, electronic kiosk devices, blade servers, mainframes, or any combination of the aforementioned. In accordance with embodiments of the invention, the user input system 140 is intended to represent various forms of mobile devices, such as personal digital assistants, cellular telephones, smartphones, and other similar computing devices. The components shown here, their connections and relationships, and their functions, are meant to be exemplary only, and are not meant to limit implementations of the inventions described and/or claimed in this document.

In accordance with some embodiments, the system 130 may include a processor 102, memory 104, a storage device 106, a high-speed interface 108 connecting to memory 104, and a low-speed interface 112 connecting to low speed bus 114 and storage device 106. Each of the components 102, 104, 106, 108, 111, and 112 are interconnected using various buses, and may be mounted on a common motherboard or in other manners as appropriate. The processor 102 can process instructions for execution within the system 130, including instructions stored in the memory 104 or on the storage device 106 to display graphical information for a GUI on an external input/output device, such as display 116 coupled to a high-speed interface 108. In other implementations, multiple processors and/or multiple buses may be used, as appropriate, along with multiple memories and types of memory. Also, multiple systems, same or similar to system 130 may be connected, with each system providing portions of the necessary operations (e.g., as a server bank, a group of blade servers, or a multi-processor system). In some embodiments, the system 130 may be a server managed by the business. The system 130 may be located at the facility associated with the business or remotely from the facility associated with the business.

The memory 104 stores information within the system 130. In one implementation, the memory 104 is a volatile memory unit or units, such as volatile random access memory (RAM) having a cache area for the temporary storage of information. In another implementation, the memory 104 is a non-volatile memory unit or units. The memory 104 may also be another form of computer-readable medium, such as a magnetic or optical disk, which may be embedded and/or may be removable. The non-volatile memory may additionally or alternatively include an EEPROM, flash memory, and/or the like. The memory 104 may store any one or more of pieces of information and data used by the system in which it resides to implement the functions of that system. In this regard, the system may dynamically utilize the volatile memory over the non-volatile memory by storing multiple pieces of information in the volatile memory, thereby reducing the load on the system and increasing the processing speed.

The storage device 106 is capable of providing mass storage for the system 130. In one aspect, the storage device 106 may be or contain a computer-readable medium, such as a floppy disk device, a hard disk device, an optical disk device, or a tape device, a flash memory or other similar solid state memory device, or an array of devices, including devices in a storage area network or other configurations. A computer program product can be tangibly embodied in an information carrier. The computer program product may also contain instructions that, when executed, perform one or more methods, such as those described above. The information carrier may be a non-transitory computer- or machine-readable storage medium, such as the memory 104, the storage device 104, or memory on processor 102.

In some embodiments, the system 130 may be configured to access, via the network 110, a number of other computing devices (not shown) in addition to the user input system 140. In this regard, the system 130 may be configured to access one or more storage devices and/or one or more memory devices associated with each of the other computing devices. In this way, the system 130 may implement dynamic allocation and de-allocation of local memory resources among multiple computing devices in a parallel or distributed system. Given a group of computing devices and a collection of interconnected local memory devices, the fragmentation of memory resources is rendered irrelevant by configuring the system 130 to dynamically allocate memory based on availability of memory either locally, or in any of the other computing devices accessible via the network. In effect, it appears as though the memory is being allocated from a central pool of memory, even though the space is distributed throughout the system. This method of dynamically allocating memory provides increased flexibility when the data size changes during the lifetime of an application and allows memory reuse for better utilization of the memory resources when the data sizes are large.

The high-speed interface 108 manages bandwidth-intensive operations for the system 130, while the low speed controller 112 manages lower bandwidth-intensive operations. Such allocation of functions is exemplary only. In some embodiments, the high-speed interface 108 is coupled to memory 104, display 116 (e.g., through a graphics processor or accelerator), and to high-speed expansion ports 111, which may accept various expansion cards (not shown). In such an implementation, low-speed controller 112 is coupled to storage device 106 and low-speed expansion port 114. The low-speed expansion port 114, which may include various communication ports (e.g., USB, Bluetooth, Ethernet, wireless Ethernet), may be coupled to one or more input/output devices, such as a keyboard, a pointing device, a scanner, or a networking device such as a switch or router, e.g., through a network adapter.

The system 130 may be implemented in a number of different forms, as shown in FIG. 1. For example, it may be implemented as a standard server, or multiple times in a group of such servers. Additionally, the system 130 may also be implemented as part of a rack server system or a personal computer such as a laptop computer. Alternatively, components from system 130 may be combined with one or more other same or similar systems and an entire system 130 may be made up of multiple computing devices communicating with each other.

In some embodiments, the system 130 and/or the user input system 140 may operatively connected to an encryption server (not shown). The encryption server may include the necessary hardware and/or software components necessary to provide on-demand encryption service that may be called upon by applications associated with the system 130 and the user input system 140 when executing any of the process flows described therein. The encryption server may be configured to receive data files from the system 130 and/or the user input system 140 for encryption. To this end, the encryption server may deploy an encryption engine that is capable of transmitting and receiving data to and from the system 130 and/or the user input system 140. In accordance with an embodiments of the invention, the system 130 and/or the user input system 140 and the encryption server may have a client-server relationship, where the system 130 and/or the user input system 140 makes a service request to the encryption server, the encryption server accepts the service request, processes the service request, and returns the requested information to the system 130 and/or the user input system 140, and vice versa. This relationship of client and server typically arises by virtue of computer programs running on the respective computers and having a client-server relationship to each other.

FIG. 1 also illustrates a user input system 140, in accordance with an embodiment of the invention. The user input system 140 includes a processor 152, memory 154, an input/output device such as a display 156, a communication interface 158, and a transceiver 160, among other components. The user input system 140 may also be provided with a storage device, such as a microdrive or other device, to provide additional storage. Each of the components 152, 154, 158, and 160, are interconnected using various buses, and several of the components may be mounted on a common motherboard or in other manners as appropriate.

The processor 152 is configured to execute instructions within the user input system 140, including instructions stored in the memory 154. The processor may be implemented as a chipset of chips that include separate and multiple analog and digital processors. The processor may be configured to provide, for example, for coordination of the other components of the user input system 140, such as control of user interfaces, applications run by user input system 140, and wireless communication by user input system 140.

The processor 152 may be configured to communicate with the user through control interface 164 and display interface 166 coupled to a display 156. The display 156 may be, for example, a TFT LCD (Thin-Film-Transistor Liquid Crystal Display) or an OLED (Organic Light Emitting Diode) display, or other appropriate display technology. The display interface 156 may comprise appropriate circuitry and configured for driving the display 156 to present graphical and other information to a user. The control interface 164 may receive commands from a user and convert them for submission to the processor 152. In addition, an external interface 168 may be provided in communication with processor 152, so as to enable near area communication of user input system 140 with other devices. External interface 168 may provide, for example, for wired communication in some implementations, or for wireless communication in other implementations, and multiple interfaces may also be used.

The memory 154 stores information within the user input system 140. The memory 154 can be implemented as one or more of a computer-readable medium or media, a volatile memory unit or units, or a non-volatile memory unit or units. Expansion memory may also be provided and connected to user input system 140 through an expansion interface (not shown), which may include, for example, a SIMM (Single In Line Memory Module) card interface. Such expansion memory may provide extra storage space for user input system 140 or may also store applications or other information therein. In some embodiments, expansion memory may include instructions to carry out or supplement the processes described above and may include secure information also. For example, expansion memory may be provided as a security module for user input system 140 and may be programmed with instructions that permit secure use of user input system 140. In addition, secure applications may be provided via the SIMM cards, along with additional information, such as placing identifying information on the SIMM card in a non-hackable manner. In some embodiments, the user may use the applications to execute processes described with respect to the process flows described herein. Specifically, the application executes the process flows described herein.

The memory 154 may include, for example, flash memory and/or NVRAM memory. In one aspect, a computer program product is tangibly embodied in an information carrier. The computer program product contains instructions that, when executed, perform one or more methods, such as those described herein. The information carrier is a computer- or machine-readable medium, such as the memory 154, expansion memory, memory on processor 152, or a propagated signal that may be received, for example, over transceiver 160 or external interface 168.

In some embodiments, the user may use the user input system 140 to transmit and/or receive information or commands to and from the system 130 via the network 110. Any communication between the system 130 and the user input system 140 (or any other computing devices) may be subject to an authentication protocol allowing the system 130 to maintain security by permitting only authenticated users (or processes) to access the protected resources of the system 130, which may include servers, databases, applications, and/or any of the components described herein. To this end, the system 130 may require the user (or process) to provide authentication credentials to determine whether the user (or process) is eligible to access the protected resources. Once the authentication credentials are validated and the user (or process) is authenticated, the system 130 may provide the user (or process) with permissioned access to the protected resources. Similarly, the user input system 140 (or any other computing devices) may provide the system 130 with permissioned to access the protected resources of the user input system 140 (or any other computing devices), which may include a GPS device, an image capturing component (e.g., camera), a microphone, a speaker, and/or any of the components described herein.

The user input system 140 may communicate with the system 130 (and one or more other devices) wirelessly through communication interface 158, which may include digital signal processing circuitry where necessary. Communication interface 158 may provide for communications under various modes or protocols, such as GSM voice calls, SMS, EMS, or MMS messaging, CDMA, TDMA, PDC, WCDMA, CDMA2000, or GPRS, among others. Such communication may occur, for example, through radio-frequency transceiver 160. In addition, short-range communication may occur, such as using a Bluetooth, Wi-Fi, or other such transceiver (not shown). In addition, GPS (Global Positioning System) receiver module 170 may provide additional navigation—and location-related wireless data to user input system 140, which may be used as appropriate by applications running thereon, and in some embodiments, one or more applications operating on the system 130.

The user input system 140 may also communicate audibly using audio codec 162, which may receive spoken information from a user and convert it to usable digital information. Audio codec 162 may likewise generate audible sound for a user, such as through a speaker, e.g., in a handset of user input system 140. Such sound may include sound from voice telephone calls, may include recorded sound (e.g., voice messages, music files, etc.) and may also include sound generated by one or more applications operating on the user input system 140, and in some embodiments, one or more applications operating on the system 130.

Various implementations of the systems and techniques described here can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor and can be implemented in a high-level procedural and/or object-oriented programming language, and/or in assembly/machine language. As used herein, the terms "machine-readable medium" "computer-readable medium" refers to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

To provide for interaction with a user, the systems and techniques described here can be implemented on a computer having a display device (e.g., a CRT (cathode ray tube) or LCD (liquid crystal display) monitor) for displaying information to the user and a keyboard and a pointing device (e.g., a mouse or a trackball) by which the user can provide input to the computer. Other kinds of devices can be used to provide for interaction with a user as well; for example, feedback provided to the user can be any form of sensory feedback (e.g., visual feedback, auditory feedback, or tactile feedback); and input from the user can be received in any form, including acoustic, speech, or tactile input.

The systems and techniques described here can be implemented in a technical environment that includes a back end component (e.g., as a data server), that includes a middleware component (e.g., an application server), that includes a front end component (e.g., a client computer having a graphical user interface or a Web browser through which a user can interact with an implementation of the systems and techniques described here), or any combination of such back end, middleware, or front end components.

As shown in FIG. 1, the components of the system 130 and the user input system 140 are interconnected using the network 110. The network 110, which may be include one or more separate networks, be a form of digital communication network such as a telecommunication network, a local area network ("LAN"), a wide area network ("WAN"), a global area network ("GAN"), the Internet, or any combination of the foregoing. It will also be understood that the network 110 may be secure and/or unsecure and may also include wireless and/or wired and/or optical interconnection technology.

In accordance with an embodiments of the invention, the components of the system environment 100, such as the system 130 and the user input system 140 may have a client-server relationship, where the user input system 140 makes a service request to the system 130, the system 130 accepts the service request, processes the service request, and returns the requested information to the user input system 140, and vice versa. This relationship of client and server typically arises by virtue of computer programs running on the respective computers and having a client-server relationship to each other.

It will be understood that the embodiment of the system environment 100 illustrated in FIG. 1 is exemplary and that other embodiments may vary. As another example, in some embodiments, the system environment may include more, fewer, or different components. As another example, in some embodiments, some or all of the portions of the system environment 100 may be combined into a single portion. Likewise, in some embodiments, some or all of the portions of the system 130 may be separated into two or more distinct portions.

FIG. 2 illustrates a process flow for a system for implementing enhanced file encryption technique 200, in accordance with an embodiment of the invention. As shown in block 202, the process flow includes receiving a request from a computing device of a user to encrypt a file. As part of the request, the system may be configured to receive the file from the computing device of the user. In some embodiments, the file may be already stored in a database. In such cases, the request from the user may identify the file in the database, in addition to requesting that the file be encrypted. In some embodiments, the request may also include a form of encryption. Encryption is often applied in two different forms, a symmetric key, or an asymmetric key. A symmetric key, or secret key, uses one key to both encrypt and decrypt the information. Asymmetric, or public key cryptography on the other hand, uses two linked keys—one private and one public. Embodiments of the invention contemplated herein employ symmetric encryption means, whereby a symmetric key is used to encrypt and decrypt the data file. The encryption form described herein is exemplary and those of skill in the art will recognize the various types of encryption forms that may be used within the spirit and scope of the presently disclosed.

Next, as shown in block 204, the process flow includes encrypting the file using a local file encryption key to generate an encrypted file. In some embodiments, the local file encryption key is a symmetric key, i.e., the same local file encryption key is also used to decrypt the encrypted file to retrieve the file. In some embodiments, in response to generating the encrypted file, the system may be configured to calculate a checksum of the encrypted file. In this regard, the system may be configured to initiate an integrity verification algorithm on the encrypted file. Examples of integrity verification algorithm may include, but is not limited to, MD5, SHA-1, SHA-256, SHA-512, and/or the like. In some embodiments, the integrity verification algorithm uses a cryptographic hash function that takes an input file and produces a string (a sequence of numbers and letters) of a fixed length. If the input file is altered or modified in any way, the resulting checksum of the modified file will be different from the checksum of the original file. By calculating the checksum of the encrypted file, the system may be configured to determine a baseline ("ground truth") which can then be used to verify the integrity of the encrypted file at any point during processing.

Next, as shown in block 206, the process flow includes transmitting, via the encryption engine, a first encryption request to an encryption server to encrypt a first portion of the encrypted file. In one aspect, the first portion of the encrypted file may be the first 1024 bytes of the encrypted file. In another aspect, the first portion of the encrypted file may be the last 1024 bytes of the encrypted file. In yet another aspect, the first portion of the encrypted file may be 1024 bytes of the encrypted file from any portion of the encrypted file. In addition to extracting the first portion of the encrypted file, the system may be configured to determine the positional values of the first portion of the encrypted file, i.e., where the first portion is extraction from. In some embodiments, in addition to transmitting the first encryption request to encrypt a first portion of the encrypted file, the system may be configured to transmit a second encryption request to the encryption server to encrypt the local file encryption key. As described herein, the local file encryption key is used to encrypt the file. Instead of storing the local file encryption key locally, the system may be configured to encrypt the local file encryption key using the encryption server. Also, in addition to transmitting the first encryption request to encrypt a first portion of the encrypted file and the second encryption request to the encryption server to encrypt the local file encryption key, the system may be configured to transmit a third encryption request to encrypt a checksum of the encrypted file. As described herein, the checksum is used to verify the integrity of the encrypted file.

Next, as shown in block 208, the process flow includes receiving, from the encryption server, an encrypted first portion of the encrypted file based on at least the first encryption request. In some embodiments, the first portion of the encrypted file is encrypted by the encryption server using a first file encryption key. In addition, the system may be configured to receive, from the encryption server, an encrypted local file encryption key based on at least the second encryption request. In some embodiments, the local encryption key is encrypted by the encryption server using a second file encryption key. Also, the system may be configured to receive, from the encryption server, an encrypted checksum based on at least the third encryption request. In some embodiments, the checksum is encrypted by the encryption server using a third file encryption key. The first file encryption key, the second file encryption key, and the third file encryption key may be stored in a hardware security module (HSM) associated with the encryption server. The HSM may be a dedicated crypto processor that is specifically designed to manage, process, and store cryptographic keys thereon.

Next, as shown in block 210, the process flow includes appending the encrypted first portion of the encryption file with a remaining portion of the encrypted file to generate a final encrypted file. In some embodiments, the system may be configured to append the encrypted local file encryption key with the first portion of the encrypted file and the remaining portion of the encrypted file to generate the final encrypted file. In some other embodiments, the system may be configured to append the encrypted checksum with the encrypted local file encryption key, the first portion of the encrypted file, and the remaining portion of the encrypted file to generate the final encrypted file.

Next, as shown in block 212, the process flow includes storing the final encrypted file in a data repository. Once stored, the encrypted file may have restricted access. Only authorized personnel may be allowed access to the file. When such an access is requested, the system may be configured to initiate the decryption process.

At any point, the system may be configured to receive an access request from the computing device of the user to access the file. In response, the system may be configured to initiate an authentication protocol to determine whether the user is authorized to access the file. In this regard, the system may be configured to transmit, via the computing device of the user, an authentication request. In response, the system may be configured to receive, via the computing device of the user, one or more authentication credentials from the user. In response, the system may be configured to validate the one or more authentication credentials. In this regard, the system may be configured to determine an authorization level of the user based on at least the one or more authentication credentials. In response, the system may be configured to determine an authorization requirement associated with accessing the file. In response, the system may be configured to determine that the authorization level of the user meets the authorization requirement associated with accessing the file. In response, the system may be configured to determine that the user is authorized to access the file based on at least determining that the authorization level of the user meets the authorization requirement associated with accessing the file. In response to determining that the user is authorized to access the file, the system may be configured to initiate the decryption process.

In some embodiments, the system may be configured to retrieve the final encryption file from the data repository. From the final encryption file, the system may be configured to extract, from the final encryption file, the encrypted first portion of the encrypted file, the encrypted local file encryption key, the encrypted checksum, and the remaining portion of the encrypted file. Once extracted, the system may be configured to transmit, via the encryption engine, a first decryption request to the encryption server to decrypt the encrypted first portion of the encrypted file. As part of the first decryption request, the system may be configured to transmit the encrypted first portion of the encrypted file to the encryption server. In response to the first decryption request, the system may be configured to receive, from the encryption server, the first portion of the encrypted file. The encrypted first portion of the encrypted file is decrypted, by the encryption server, using the first file encryption key, the same key used to encrypt the first portion of the encrypted file during the encryption process.

Having received the first portion of the encrypted file, the system may be configured to transmit, via the encryption engine, a second decryption request to the encryption server to decrypt the encrypted local file encryption key. As part of the second decryption request, the system may be configured to transmit the encrypted local file encryption key to the encryption server. In response to the second decryption request, the system may be configured to receive, from the encryption server, the local file encryption key. The encrypted local file encryption key is decrypted, by the encryption server, using the second file encryption key, the same key used to encrypt the local file encryption key during the encryption process.

Having received the first portion of the encrypted file and the local file encryption key, the system may be configured to transmit, via the encryption engine, a third decryption request to the encryption server to decrypt the encrypted checksum. As part of the third decryption request, the system may be configured to transmit the encrypted checksum to the encryption server. In response to the third decryption request, the system may be configured to receive, from the encryption server, the checksum. The encrypted checksum is decrypted, by the encryption server, using the third file encryption key, the same key used to encrypt the checksum during the encryption process.

Having received the first portion of the encrypted file, the local file encryption key, and the checksum, the system may be configured to append the first portion of the encrypted file with the remaining portion of the encrypted file to create the appended encrypted file. Having created the appended encrypted file, the system may be configured to calculate the checksum of the appended encrypted file. The checksum of the appended encrypted file is then compared with the checksum of the encrypted file to determine a match. Based on the matching checksums, the system may be configured to determine that the appended encrypted file is identical to the encrypted file, indicating that the encrypted file has not been modified since being encrypted. If the checksums do not match, the system may be configured to transmit control signals configured to cause the computing device of the user to display an alert notification indicating that the checksum do not match, and that the encrypted file has been altered or modified. Having confirmed that the encrypted file has not been modified, the system may be configured to decrypt the appended encryption file using the local file encryption key to generate the file. In response to generating the file, the system may be configured to transmit control signals configured to cause the computing device of the user to display the file.

FIG. 3 illustrates a data flow diagram of the encryption process 300, in accordance with an embodiment of the invention. At step 302, the system generates a local file encryption key (FEK) that will be used to encrypt the file. At step 304, the system encrypts the file with the FEK and generates the encrypted file. At step 306, the system extracts a first portion of the encrypted file. At step 308, the system extracts the remaining portion of the encrypted file and separates the remaining portion from the first portion. At 310, the system calculates the checksum of the encrypted file. At step 312, the FEK is encrypted by the encryption server. At step 314, the first portion of the encryption file is encrypted by the encryption server. At step 314, the checksum is encrypted by the encryption server. At step 318, the encrypted FEK, the encrypted first portion of the encrypted file, the encrypted checksum, and the remaining portion of the encrypted file are appended to one another to form the final encryption file that is stored in the data repository.

FIG. 4 illustrates a data flow diagram of the decryption process 400, in accordance with an embodiment of the invention. At step 402, the system receives an authorized request to access the file. At step 404, the system retrieves the final encryption file from the data repository. At step 406, the system extracts the encrypted FEK from the final encryption file. At step 408, the system extracts the encrypted first portion of the encrypted file from the final encryption file. At step 410, the system extracts the encrypted checksum from the final encryption file. At step 412, the system extracts the remaining portion of the encrypted file. Once extracted, at step 414, the encrypted FEK is decrypted by the encryption server. At step 416, the encrypted first portion of the encrypted file is decrypted by the encryption server. At step 418, the encrypted checksum is decrypted by the encryption server. Next, at step 420, the system recreates the encryption file by appending the first portion of the encryption file and the remaining portion of the encrypted file. At step 422, the system verifies the integrity of the appended encrypted file by calculating its checksum and comparing it with the checksum of the original encryption file to determine a match. If the checksums match, it is an indication that the encrypted file has not been altered and is ready for decryption. At step 424, the system then decrypts the appended encryption file with the FEK. At step 426, the system provides the user with access to the file.

As will be appreciated by one of ordinary skill in the art in view of this disclosure, the present invention may include and/or be embodied as an apparatus (including, for example, a system, machine, device, computer program product, and/or the like), as a method (including, for example, a business method, computer-implemented process, and/or the like), or as any combination of the foregoing. Accordingly, embodiments of the present invention may take the form of an entirely business method embodiment, an entirely software embodiment (including firmware, resident software, micro-code, stored procedures in a database, or the like), an entirely hardware embodiment, or an embodiment combining business method, software, and hardware aspects that may generally be referred to herein as a "system." Furthermore, embodiments of the present invention may take the form of a computer program product that includes a computer-readable storage medium having one or more computer-executable program code portions stored therein. As used herein, a processor, which may include one or more processors, may be "configured to" perform a certain function in a variety of ways, including, for example, by having one or more general-purpose circuits perform the function by executing one or more computer-executable program code portions embodied in a computer-readable medium, and/or by having one or more application-specific circuits perform the function.

It will be understood that any suitable computer-readable medium may be utilized. The computer-readable medium may include, but is not limited to, a non-transitory computer-readable medium, such as a tangible electronic, magnetic, optical, electromagnetic, infrared, and/or semiconductor system, device, and/or other apparatus. For example, in some embodiments, the non-transitory computer-readable medium includes a tangible medium such as a portable computer diskette, a hard disk, a random access memory (RAM), a read-only memory (ROM), an erasable programmable read-only memory (EPROM or Flash memory), a compact disc read-only memory (CD-ROM), and/or some other tangible optical and/or magnetic storage device. In other embodiments of the present invention, however, the computer-readable medium may be transitory, such as, for example, a propagation signal including computer-executable program code portions embodied therein.

One or more computer-executable program code portions for carrying out operations of the present invention may include object-oriented, scripted, and/or unscripted programming languages, such as, for example, Java, Perl, Smalltalk, C++, SAS, SQL, Python, Objective C, JavaScript, and/or the like. In some embodiments, the one or more computer-executable program code portions for carrying out operations of embodiments of the present invention are written in conventional procedural programming languages, such as the "C" programming languages and/or similar programming languages. The computer program code may alternatively or additionally be written in one or more multi-paradigm programming languages, such as, for example, F #.

Some embodiments of the present invention are described herein with reference to flowchart illustrations and/or block diagrams of apparatus and/or methods. It will be understood that each block included in the flowchart illustrations and/or block diagrams, and/or combinations of blocks included in the flowchart illustrations and/or block diagrams, may be implemented by one or more computer-executable program code portions. These one or more computer-executable program code portions may be provided to a processor of a general purpose computer, special purpose computer, and/or some other programmable data processing apparatus in order to produce a particular machine, such that the one or more computer-executable program code portions, which execute via the processor of the computer and/or other programmable data processing apparatus, create mechanisms for implementing the steps and/or functions represented by the flowchart(s) and/or block diagram block(s).

The one or more computer-executable program code portions may be stored in a transitory and/or non-transitory computer-readable medium (e.g. a memory) that can direct, instruct, and/or cause a computer and/or other programmable data processing apparatus to function in a particular manner, such that the computer-executable program code portions stored in the computer-readable medium produce an article of manufacture including instruction mechanisms which implement the steps and/or functions specified in the flowchart(s) and/or block diagram block(s).

The one or more computer-executable program code portions may also be loaded onto a computer and/or other programmable data processing apparatus to cause a series of operational steps to be performed on the computer and/or other programmable apparatus. In some embodiments, this produces a computer-implemented process such that the one or more computer-executable program code portions which execute on the computer and/or other programmable apparatus provide operational steps to implement the steps specified in the flowchart(s) and/or the functions specified in the block diagram block(s). Alternatively, computer-implemented steps may be combined with, and/or replaced with, operator- and/or human-implemented steps in order to carry out an embodiment of the present invention.

Although many embodiments of the present invention have just been described above, the present invention may be embodied in many different forms and should not be construed as limited to the embodiments set forth herein; rather, these embodiments are provided so that this disclosure will satisfy applicable legal requirements. Also, it will be understood that, where possible, any of the advantages, features, functions, devices, and/or operational aspects of any of the embodiments of the present invention described and/or contemplated herein may be included in any of the other embodiments of the present invention described and/or contemplated herein, and/or vice versa. In addition, where possible, any terms expressed in the singular form herein are meant to also include the plural form and/or vice versa, unless explicitly stated otherwise. Accordingly, the terms "a" and/or "an" shall mean "one or more," even though the phrase "one or more" is also used herein. Like numbers refer to like elements throughout.

While certain exemplary embodiments have been described and shown in the accompanying drawings, it is to be understood that such embodiments are merely illustrative of and not restrictive on the broad invention, and that this invention not be limited to the specific constructions and arrangements shown and described, since various other changes, combinations, omissions, modifications and substitutions, in addition to those set forth in the above paragraphs, are possible. Those skilled in the art will appreciate that various adaptations, modifications, and combinations of the just described embodiments can be configured without departing from the scope and spirit of the invention. Therefore, it is to be understood that, within the scope of the appended claims, the invention may be practiced other than as specifically described herein.

What is claimed is:

1. A system for implementing enhanced file encryption technique, the system comprising:
    at least one processing device; and
        at least one non-transitory computer-readable medium with computer-readable program code stored thereon and accessible by the at least one processing device, wherein the computer-readable code when executed is configured to cause the at least one processing device to:
        encrypt a file using a local file encryption key to generate an encrypted file;
        transmit, via an encryption engine, a first encryption request to an encryption server to encrypt a first portion of the encrypted file;
        receive, from the encryption server, an encrypted first portion of the encrypted file based on at least the first encryption request, wherein the first portion of the encrypted file is encrypted by the encryption server using a first file encryption key;
        append the encrypted first portion of the encryption file with a remaining portion of the encrypted file to generate a final encrypted file;
        transmit, via the encryption engine, a second encryption request to the encryption server to encrypt the local file encryption key;
        receive, from the encryption server, an encrypted local file encryption key based on at least the second encryption request;
        update the final encrypted file with the encrypted local file encryption key, wherein updating further comprises appending the encrypted local file encryption key with the first portion of the encrypted file and the remaining portion of the encrypted file;
        calculate a checksum for the encrypted file;
        update the final encrypted file with the encrypted checksum;
        store the final encrypted file in a data repository;
        receive an access request from a computing device associated with a user to access the file;
        initiate an authentication protocol to determine whether the user is authorized to access the file;
        decrypt the final encrypted file based on at least determining that the user is authorized to access the file, wherein decrypting further comprises:
        retrieving the final encryption file from the data repository; and
        extracting, from the final encryption file, the encrypted first portion of the encrypted file, and the remaining portion of the encrypted file;
        receiving, in response to a first decryption request, the first portion of the encrypted file decrypted using the first file encryption key;
        appending the first portion of the encrypted file to the remaining portion of the encrypted file to generate an appended encrypted file;
        comparing the checksum of the appended encrypted file with the checksum of the encrypted file to determine a match; and determining that the appended encrypted file is identical the encrypted file based on at least the match.

2. The system of claim 1 wherein the local encryption key is encrypted by the encryption server using a second file encryption key.

3. The system of claim 2, wherein the non-transitory computer-readable medium further comprises code configured to cause the at least one processing device to:
calculate a checksum for the encrypted file;
transmit, via the encryption engine, a third encryption request to the encryption server to encrypt the checksum;
receive, from the encryption server, an encrypted checksum based on at least the third encryption request, wherein the checksum is encrypted by the encryption server using a third file encryption key; and
update the final encrypted file with the encrypted checksum.

4. The system of claim 3, wherein updating the final encrypted file comprises appending the encrypted checksum with the encrypted local file encryption key, the first portion of the encrypted file, and the remaining portion of the encrypted file.

5. The system of claim 1, wherein the non-transitory computer-readable medium further comprises code configured to cause the at least one processing device to: initiate the authentication protocol, wherein initiating further comprises:
transmitting, via the computing device of the user, an authentication request;
receiving, via the computing device of the user, one or more authentication credentials from the user;
validating the one or more authentication credentials; and
determining that the user is authorized to access the file based on at least validating the one or more authentication credentials.

6. The system of claim 5, wherein the non-transitory computer-readable medium further comprises code configured to cause the at least one processing device to: validate the one or more authentication credentials, wherein validating further comprises:
determining an authorization level of the user based on at least the one or more authentication credentials;
determining an authorization requirement associated with accessing the file;
determining that the authorization level of the user meets the authorization requirement associated with accessing the file; and
determining that the user is authorized to access the file based on at least determining that the authorization level of the user meets the authorization requirement associated with accessing the file.

7. The system of claim 1, wherein the non-transitory computer-readable medium further comprises code configured to cause the at least one processing device to:
retrieve the final encryption file from the data repository; and
extract, from the final encryption file, the encrypted first portion of the encrypted file, the encrypted local file encryption key and the remaining portion of the encrypted file.

8. The system of claim 7, wherein the non-transitory computer-readable medium further comprises code configured to cause the at least one processing device to:
transmit, via the encryption engine, a first decryption request to the encryption server to decrypt the encrypted first portion of the encrypted file, wherein the first decryption request comprises the encrypted first portion of the encrypted file; and
receive, from the encryption server, the first portion of the encrypted file based on at least the first decryption request, wherein the first portion of the encrypted file is decrypted by the encryption server using the first file encryption key.

9. The system of claim 3, wherein the non-transitory computer-readable medium further comprises code configured to cause the at least one processing device to:
transmit, via the encryption engine, a first decryption request to the encryption server to decrypt the encrypted first portion of the encrypted file, wherein the first decryption request comprises the encrypted first portion of the encrypted file;
receive, from the encryption server, the first portion of the encrypted file based on at least the first decryption request, wherein the first portion of the encrypted file is decrypted by the encryption server using the first file encryption key;
transmit, via the encryption engine, a second decryption request to the encryption server to decrypt the encrypted local file encryption key, wherein the second decryption request comprises the encrypted first file encryption key; and
receive, from the encryption server, the local file encryption key based on at least the second decryption request, wherein the encrypted local file encryption key is decrypted by the encryption server using the second file encryption key.

10. The system of claim 9, wherein the non-transitory computer-readable medium further comprises code configured to cause the at least one processing device to:
transmit, via the encryption engine, a first decryption request to the encryption server to decrypt the encrypted first portion of the encrypted file, wherein the first decryption request comprises the encrypted first portion of the encrypted file;
receive, from the encryption server, the first portion of the encrypted file based on at least the first decryption request, wherein the first portion of the encrypted file is decrypted by the encryption server using the first file encryption key;
transmit, via the encryption engine, a second decryption request to the encryption server to decrypt the encrypted local file encryption key, wherein the second decryption request comprises the encrypted first file encryption key;
receive, from the encryption server, the local file encryption key based on at least the second decryption request, wherein the encrypted local file encryption key is decrypted by the encryption server using the second file encryption key
transmit, via the encryption engine, a third decryption request to the encryption server to decrypt the encrypted checksum, wherein the third decryption request comprises the encrypted checksum; and
receive, from the encryption server, the checksum based on at least the third decryption request, wherein the encrypted checksum is decrypted by the encryption server using the third file encryption key.

11. The system of claim 10, wherein the non-transitory computer-readable medium further comprises code configured to cause the at least one processing device to:
decrypt the appended encrypted file using the local file encryption key to generate the file; and transmit control signals configured to cause the computing device of the user to display the file.

12. A computer program product for implementing enhanced file encryption technique, the computer program product comprising a non-transitory computer-readable medium comprising code causing a first apparatus to:
    encrypt a file using a local file encryption key to generate an encrypted file;
    transmit, via an encryption engine, a first encryption request to an encryption server to encrypt a first portion of the encrypted file;
    receive, from the encryption server, an encrypted first portion of the encrypted file based on at least the first encryption request, wherein the first portion of the encrypted file is encrypted by the encryption server using a first file encryption key;
    append the encrypted first portion of the encryption file with a remaining portion of the encrypted file to generate a final encrypted file;
    transmit, via the encryption engine, a second encryption request to the encryption server to encrypt the local file encryption key;
    receive, from the encryption server, an encrypted local file encryption key based on at least the second encryption request;
    update the final encrypted file with the encrypted local file encryption key, wherein updating further comprises appending the encrypted local file encryption key with the first portion of the encrypted file and the remaining portion of the encrypted file;
    store the final encrypted file in a data repository;
    receive an access request from a computing device associated with a user to access the file;
    initiate an authentication protocol to determine whether the user is authorized to access the file; and
    decrypt the final encrypted file based on at least determining that the user is authorized to access the file.

13. The computer program product of claim 12, wherein the local encryption key is encrypted by the encryption server using a second file encryption key.

14. The computer program product of claim 13, wherein the non-transitory computer-readable medium further comprises code configured to cause at least one processing device to:
    calculate a checksum for the encrypted file;
    transmit, via the encryption engine, a third encryption request to the encryption server to encrypt the checksum;
    receive, from the encryption server, an encrypted checksum based on at least the third encryption request, wherein the checksum is encrypted by the encryption server using a third file encryption key; and
    update the final encrypted file with the encrypted checksum.

15. The computer program product of claim 14, wherein updating the final encrypted file comprises appending the encrypted checksum with the encrypted local file encryption key, the first portion of the encrypted file, and the remaining portion of the encrypted file.

16. The computer program product of claim 12, wherein the non-transitory computer-readable medium further comprises code configured to cause at least one processing device to: initiate the authentication protocol, wherein initiating further comprises:
    transmitting, via the computing device of the user, an authentication request;
    receiving, via the computing device of the user, one or more authentication credentials from the user;
    validating the one or more authentication credentials; and
    determining that the user is authorized to access the file based on at least validating the one or more authentication credentials.

17. The computer program product of claim 16, wherein the non-transitory computer-readable medium further comprises code configured to cause at least one processing device to: validate the one or more authentication credentials, wherein validating further comprises:
    determining an authorization level of the user based on at least the one or more authentication credentials;
    determining an authorization requirement associated with accessing the file;
    determining that the authorization level of the user meets the authorization requirement associated with accessing the file; and
    determining that the user is authorized to access the file based on at least determining that the authorization level of the user meets the authorization requirement associated with accessing the file.

18. A method for implementing enhanced file encryption technique, the method comprising:
    encrypting a file using a local file encryption key to generate an encrypted file;
    transmitting, via an encryption engine, a first encryption request to an encryption server to encrypt a first portion of the encrypted file;
    receiving, from the encryption server, an encrypted first portion of the encrypted file based on at least the first encryption request, wherein the first portion of the encrypted file is encrypted by the encryption server using a first file encryption key;
    appending the encrypted first portion of the encryption file with a remaining portion of the encrypted file to generate a final encrypted file;
    transmitting, via the encryption engine, a second encryption request to the encryption server to encrypt the local file encryption key;
    receiving, from the encryption server, an encrypted local file encryption key based on at least the second encryption request;
    updating the final encrypted file with the encrypted local file encryption key, wherein updating further comprises appending the encrypted local file encryption key with the first portion of the encrypted file and the remaining portion of the encrypted file;
    calculating a checksum for the encrypted file;
    updating the final encrypted file with the encrypted checksum;
    storing the final encrypted file in a data repository;
    receiving an access request from a computing device associated with a user to access the file;
    initiating an authentication protocol to determine whether the user is authorized to access the file;
    decrypting the final encrypted file based on at least determining that the user is authorized to access the file, wherein decrypting further comprises:
    retrieving the final encryption file from the data repository; and
    extracting, from the final encryption file, the encrypted first portion of the encrypted file, and the remaining portion of the encrypted file;
    receiving, in response to a first decryption request, the first portion of the encrypted file decrypted using the first file encryption key;

appending the first portion of the encrypted file to the remaining portion of the encrypted file to generate an appended encrypted file;
comparing the checksum of the appended encrypted file with the checksum of the encrypted file to determine a match; and
determining that the appended encrypted file is identical the encrypted file based on at least the match.

* * * * *